(12) United States Patent
Hatanaka et al.

(10) Patent No.: US 10,472,451 B2
(45) Date of Patent: Nov. 12, 2019

(54) METHOD FOR PRODUCING ANIONIC POLYMER

(71) Applicant: KURARAY CO., LTD., Kurashiki-shi (JP)

(72) Inventors: Yasuhiro Hatanaka, Kamisu (JP); Tomoaki Tsuji, Kurashiki (JP); Syuichi Sunaga, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/508,773

(22) PCT Filed: Sep. 3, 2015

(86) PCT No.: PCT/JP2015/075126
§ 371 (c)(1),
(2) Date: Mar. 3, 2017

(87) PCT Pub. No.: WO2016/035866
PCT Pub. Date: Mar. 10, 2016

(65) Prior Publication Data
US 2017/0283540 A1    Oct. 5, 2017

(30) Foreign Application Priority Data
Sep. 4, 2014   (JP) ................................. 2014-180094

(51) Int. Cl.
   *C08F 297/04*    (2006.01)
   *C08F 2/06*      (2006.01)
   *C08F 36/06*     (2006.01)

(52) U.S. Cl.
   CPC .............. *C08F 297/04* (2013.01); *C08F 2/06* (2013.01); *C08F 36/06* (2013.01)

(58) Field of Classification Search
   CPC .......... C08F 2/06; C08F 36/06; C08F 2400/02
   See application file for complete search history.

(56) References Cited

U.S. PATENT DOCUMENTS

| 3,281,383 A | 10/1966 | Zelinski et al. |
| 3,644,588 A | 2/1972 | Hassell |

(Continued)

FOREIGN PATENT DOCUMENTS

| CN | 101081879 A | 12/2007 |
| JP | 58-84809 A | 5/1983 |

(Continued)

OTHER PUBLICATIONS

Wild et al. The Chemical Engineering Journal 15, 3, 209-214 (Year: 1978).*

(Continued)

*Primary Examiner* — Mark S Kaucher
(74) *Attorney, Agent, or Firm* — Oblon, McClelland, Maier & Neustadt, L.L.P.

(57) ABSTRACT

Provided is a method for producing an anionic polymer in an industrially advantageous manner, whereby at the time of anionically polymerizing monomers using a solvent whose boiling point at atmospheric pressure is higher than the polymerization temperature, temperature control can be achieved by quickly removing the heat of the polymerization reaction using a simple device. The method for producing an anionic polymer includes anionically polymerizing a conjugated diene, an aromatic vinyl compound, or a mixture thereof under a condition where the amount of an inert gas present with respect to 1 kg of a solvent whose boiling point at atmospheric pressure is higher than the polymerization temperature is 20 mmol or less.

12 Claims, 1 Drawing Sheet

(56) References Cited

U.S. PATENT DOCUMENTS

| | | | |
|---|---|---|---|
| 4,396,761 A | 8/1983 | Willis et al. | |
| 5,334,566 A | 8/1994 | Gibler et al. | |
| 5,436,298 A * | 7/1995 | Moczygemba | C08F 297/044 525/250 |
| 5,587,437 A * | 12/1996 | Adachi | B01J 19/18 526/344.2 |
| 6,306,976 B1 | 10/2001 | Matsuda et al. | |
| 6,313,230 B1 | 11/2001 | Tsai et al. | |
| 6,461,993 B1 | 10/2002 | Van Der Heijden et al. | |
| 6,657,028 B1 * | 12/2003 | Aplin | C08F 12/04 526/173 |
| 8,598,286 B1 * | 12/2013 | Flook | C08F 236/10 526/153 |
| 2007/0254802 A1 | 11/2007 | Lin et al. | |
| 2008/0039584 A1 | 2/2008 | Bening et al. | |
| 2009/0131558 A1 | 5/2009 | Kim et al. | |

FOREIGN PATENT DOCUMENTS

| | | |
|---|---|---|
| JP | 61-98702 A | 5/1986 |
| JP | 1-275611 A | 11/1989 |
| JP | 3-88803 A | 4/1991 |
| JP | 7-48495 A | 2/1995 |
| JP | 8-208712 A | 8/1996 |
| JP | 10-218953 A | 8/1998 |
| JP | 10-306106 A | 11/1998 |
| JP | 2000-80115 A | 3/2000 |
| JP | 2000-159819 A | 6/2000 |
| JP | 2001-270913 A | 10/2001 |
| JP | 2001-316403 A | 11/2001 |
| JP | 2003-2908 A | 1/2003 |
| JP | 2003-261740 A | 9/2003 |
| JP | 2003-268012 A | 9/2003 |
| JP | 2006-241289 A | 9/2006 |

OTHER PUBLICATIONS

Hadjichristidis et al. J. Polym. Sci. Part A: Polym. Chem. vol. 38, pp. 3211-3234. (Year: 2000).*

Morton et al. Anionic polymerization of Vinyl monomers. (Year: 1975) Rubber Chemistry and Technology, Jul. 1975, vol. 48, No. 3, pp. 359-409.*

Y. Saeki, et al., "Technical progresses for PVC production," Progress in Polymer Science, vol. 27, 2002, pp. 2055-2131.

M. Miyamoto, "An Outline of the Development of Poly Vinyl Chloride Technology in Japan, Including a Description of Historical Materials," The National Museum of Nature and Science in Japan, Survey Reports on the Systemization of Technologies, $1^{st}$ Edition, 2001, pp. 75-104 (Wth English abstract).

International Search Report dated Oct. 20, 2015 in PCT/JP2015/075126 filed Sep. 3, 2015.

Extended European Search Report dated Mar. 1, 2018 in Patent Application No. 15838378.6, 8 pages.

Boyd, J.H. "Commercial Chemical Development of Butadiene", Industrial and Engineering Chemistry, vol. 40. No. 9, XP055452692, Sep. 1, 1948, pp. 1703-1707.

Combined Chinese Office Action and Search Report dated Feb. 9, 2018 in Chinese Patent Application No. 201580047566.2 (with English translation of Category of Cited Documents), 7 pages.

Information Offer Form issued Dec. 18, 2018 in Japanese Patent Application No. 2016-546698.

Yu et al., "High Polymer Chemistry", Nov. 1994, pp. 177 and 178, ISBN:7-305-02682 2/O • 190 (with English Translation).

Office Action dated Apr. 16, 2019, in Chinese Patent Application No. 201580047566.2 filed Sep. 3, 2015.

* cited by examiner

METHOD FOR PRODUCING ANIONIC POLYMER

CROSS-REFERENCE TO RELATED APPLICATIONS

This application is a National Stage of PCT/JP2015/075126, which was filed on. Sep. 3, 2015. This application is based upon and claims the benefit of priority to Japanese Application No. 2014-180094, which was filed on Sep. 4, 2014.

TECHNICAL FIELD

The present invention relates to a method for producing an anionic polymer.

BACKGROUND ART

It is known that an anionic polymer can be produced by anionically polymerizing monomers such as a conjugated diene, an aromatic vinyl compound, or the like, using an organic alkali metal compound or a living polymer formed by a polymerization of a conjugated diene, an aromatic vinyl compound, or mixture thereof. Further, it is known that the heat resistance, the oxidation resistance, the weather resistance, the ozone resistance, and the like of a polymer can be improved by hydrogenating an unsaturated double bond derived from a conjugated diene using a hydrogenation catalyst such as a nickel-based Ziegler catalyst and a titanium catalyst. These are industrially used as synthetic rubbers (see PTLs 1 to 12).

The temperature for anionic polymerization is usually 20° C. to 110° C., and as the polymerization temperature is higher, the polymerization rate increases. However, in a case where the polymerization temperature is higher than 110° C., the polymerization is terminated in the middle of the process, and as a result, a polymer having a broad molecular weight distribution is produced, and thus, the mechanical properties of the obtained polymer are deteriorated. Further, it is also known that in a case of an anionic polymer using a conjugated diene as a monomer, its mechanical properties are controllable by a binding mode of the conjugated diene, and the binding mode is controllable by the type and the amount of a Lewis base which coexists during the polymerization of the conjugated diene, and also by the polymerization temperature. Therefore, in order to produce an anionic polymer having excellent mechanical properties, it is important to rapidly remove the heat of the polymerization reaction to control the temperature in the anionic polymerization reaction (see PTL 1).

As a complete mixing-type reaction vessel capable of quickly removing the heat of the polymerization reaction, a reaction vessel having a cooling coil provided therein is known. However, due to the complex structure of such a cooling coil and the high viscosity of a reaction liquid containing a polymer, a sparingly soluble polymer, a gel, and the like are deposited in the cooling coil. A molded article using an anionic polymer containing such a sparingly soluble polymer or gel has a remarkably reduced product value in terms of the concave-convex surface and the uneven transparency. Further, a reaction vessel having a type providing a cooling coil therein has a problem in that the ratio of the heat transfer area of the cooling coil to the volume of the reaction liquid decreases due to an increase in the size. For this reason, a method in which a reflux condenser is provided in a complete mixing-type reaction vessel to condense and cool monomers or a solvent is provided (see PTLs 9 to 12 and NPLs 1 and 2).

PTL 9 discloses a method for producing a styrene-butadiene copolymer, in which at the time of polymerizing butadiene and styrene in the presence of an ether compound or a tertiary amine compound using an organic lithium compound in a hydrocarbon solvent, batch polymerization is performed using a reflux-type self-cooling reaction vessel equipped with a condenser, a random styrene-butadiene copolymer which does not substantially include a polystyrene block chain in the terminal of the polymer is produced, and then a coupling reaction is performed such that a copolymer produced using a halogenated tin compound includes at least 10% of a polymer including a carbon-tin bond chain. According to PTL 9, it is described that since the inside of a polymerization system can be cooled by the evaporation reflux of butadiene, it is easy to suppress an increase in the temperature which may be caused by the heat of the polymerization reaction, and the maximum temperature to which the polymerization system reaches can be kept at 120° C. or lower.

PTL 10 discloses a method for producing at least one kind of conjugated diene and at least one kind of vinyl aromatic compound, in which a solvent including at least 60% by weight of cyclopentane is used, and the heat of the polymerization reaction is recovered by the reflux cooling of cyclopentane.

PTLs 11 and 12 disclose a method in which at the time of performing solution polymerization of a block copolymer including an aromatic vinyl compound and a conjugated diene compound using an organic metal as a polymerization initiator, using a reactor having a space occupied by solvent vapor, monomer vapor, and an inert gas present in the upper part of the reactor during the polymerization reaction, a gas in a gas phase portion of the upper part of the reactor is guided to a heat exchanger provided in the outside of the reactor, a liquid mainly composed of a solvent condensed in the heat exchanger is returned to the gas phase portion of the reactor, and a gas mainly composed of inert gases, not condensed, is forcibly returned to a liquid phase portion in the lower part of the reactor to control the polymerization, and also disclose that by such a method, the heat of the polymerization reaction generated is removed mainly by the latent heat of the solvent evaporated.

CITATION LIST

Patent Literature

PTL 1: U.S. Pat. No. 3,281,383
PTL 2: U.S. Pat. No. 3,644,588
PTL 3: U.S. Pat. No. 4,396,761
PTL 4: U.S. Pat. No. 5,334,566
PTL 5: U.S. Pat. No. 6,461,993
PTL 6: JP-A-2001-270913
PTL 7: U.S. Pat. No. 6,313,230
PTL 8: US-A-2007/0254802
PTL 9: JP-A-S58-84809
PTL 10: JP-A-H03-88803
PTL 11: JP-A-H10-306106
PTL 12: JP-A-2000-159819

Non Patent Literature

NPL 1: Progress in Polymer Science, vol. 27, 2002, pp. 2055 to 2131
NPL 2: The National Museum of Nature and Science, in Japan, Survey Reports on the Systemization of Technologies, 1st Edition, 2001, pp. 75 to 104

SUMMARY OF INVENTION

Technical Problem

PTL 9 discloses a method in which monomers whose boiling point at room temperature is lower than that of a solvent, are condensed and refluxed. In Example 1, it is described that the pressure of the inside of a polymerization system is kept constant at 2.0 kg/cm$^2$G (0.2 MPaG: gauge pressure, the same meaning shall apply hereinafter in the present specification) by a control valve, the temperature of the inside of the polymerization system is kept constant at 70° C. by the latent heat of butadiene and cyclohexane, and the evaporated butadiene and cyclohexane are refluxed using a condenser cooled with ammonia (a boiling point of −33° C.) in the upper part of the reaction vessel. However, since the saturated vapor pressure at 70° C. of cyclohexane is 0.073 MPa (0.173 MPaG), it is clear that most of the heat removal in the polymerization reaction system is conducted by refluxing, condensing, and cooling butadiene. That is, in this method, there is a problem that since the amount of monomer condensed and refluxed decreases with the progress of the polymerization, the heat removal during the second half of the polymerization becomes difficult. In addition, since it is necessary to use a cryogenic refrigerant such as ammonia in order to reflux, condense, and cool butadiene, expensive refrigerant, refrigeration equipment, or the like is required, which is thus hard to be mentioned as being economically advantageous.

PTL 10 describes utility of the use of a low-boiling-point solvent having a boiling point lower than the polymerization reaction temperature. Here, it is necessary to remove a solvent in order to isolate a polymer from a reaction liquid including an anionic polymer or a solution which has been subjected to a treatment such as hydrogenation, if necessary. For the removal of the solvent, steam which is inexpensive and industrially easily available is used, and coagulation for removing the solvent by bring the reaction liquid into contact with steam is generally employed. Immediately after the steam condensation, condensation water reaches near 100° C., and a large condenser and a low-temperature refrigerant generator are required in order to recover a number of low-boiling-point solvents which vaporize. Accordingly, a method using a low-boiling-point solvent is not always economically advantageous.

PTLs 11 and 12 disclose that the latent heat of a solvent can be used for heat removal to enhance heat removal capability by forcibly returning a gas mainly composed of inert gases not condensed to a liquid phase portion of the lower part of a reactor. This is not necessarily economically advantageous due to problems in that transporting facilities such as a blower are required and the monomers are polymerized over time to block the circulation path and lock the blower rotation unit.

That is, any method effective for anionically polymerizing monomers using a solvent whose boiling point at atmospheric pressure is higher than the polymerization temperature is not found yet, and there has been a demand for a polymerization method capable of enhancing the heat removal efficiency with a simple reaction vessel even in a case of using a solvent whose boiling point at atmospheric pressure is higher than the polymerization temperature.

Solution to Problem

The present inventors have conducted extensive studies, and as a result, they have found that at the time of anionically polymerizing monomers using a solvent whose boiling point at atmospheric pressure is higher than the polymerization temperature, the heat of the polymerization reaction can be quickly removed with a simple reaction vessel by setting the amount of inert gases with respect to 1 kg of a solvent to a specific amount. Particularly, the present inventors have found that even in a case of anionically polymerizing butadiene having a boiling point at atmospheric pressure at −4.4° C. in a cyclohexane solvent having a boiling point at atmospheric pressure of 80.7° C. under a condition where an inert gas is not substantially present at 50° C. to 55° C., the butadiene polymerization rate and the conversion rate, which are comparable to those of the case where a large amount of inert gases are present in the system for promoting the liquefaction of butadiene, can be achieved, and the heat of the polymerization reaction can be quickly removed with a simple reaction vessel, whereby the polymerization temperature can be controlled, thus completing the present invention.

That is, the present invention provides the following.

[1] a method for producing an anionic polymer, including: anionically polymerizing a conjugated diene, an aromatic vinyl compound, or a mixture thereof under a condition where the amount of an inert gas present with respect to 1 kg of a solvent whose boiling point at atmospheric pressure is higher than the polymerization temperature is 20 mmol or less.

[2] the method for producing an anionic polymer of [1], in which an organic alkali metal compound, or a living copolymer formed by the polymerization of any one of one or more kinds of conjugated diene, one or more kinds of aromatic vinyl compound, and one or more kinds of conjugated diene and one or more kinds of aromatic vinyl compound using the organic alkali metal compound is used as an initiator for anionic polymerization.

[3] the method for producing an anionic polymer of [1] or [2], in which the polymerization is performed in a complete mixing-type reaction vessel having a reflux condenser having an A/V ratio of the heat transfer area A (m$^2$) of the reflux condenser to the inner volume V (m$^3$) of the reaction vessel of 20 to 0.1.

[4] the method for producing an anionic polymer of any one of [1] to [3], in which the anionic polymerization is performed at a reaction temperature falling within a range of 20° C. to 110° C.

[5] the method for producing an anionic polymer of any one of [1] to [4], in which the solvent includes 50% by mass or more of cyclohexane.

[6] the method for producing an anionic polymer of any one of [1] to [5], in which the anionic polymer is a block copolymer.

Advantageous Effects of Invention

According to the present invention, on anionically polymerizing monomers using a solvent whose boiling point at atmospheric pressure is higher than the polymerization temperature, temperature control can be achieved by quickly removing the heat of the polymerization reaction using a simple device, thereby producing an anionic polymer in an industrially advantageous manner.

DESCRIPTION OF EMBODIMENTS

Hereinafter, the present invention will be described in detail. Incidentally, it is highly preferable to previously remove water, hydroxy compounds such as alcohols, ketones, and the like which cause the anionic polymerization to be terminated, from chemicals other than a polymerization terminator to be used in the production method of the present invention. Further, these chemicals are preferably stored in the presence of an inert gas, and these chemicals have an inert gas dissolved therein.

In addition, the "inert gas" as mentioned in the present specification means poorly reactive gases such as a nitrogen gas, an argon gas, and a helium gas.

(Monomer)

First, a monomer constituting an anionic polymer to be produced according to the production method of the present invention will be described. As the monomer, a conjugated diene, an aromatic vinyl compound, or a mixture thereof can be used.

Examples of the conjugated diene which can be used as the monomer include, but not limited to, conjugated dienes preferably having 4 to 15 carbon atoms, such as butadiene, isoprene, 2,3-dimethyl-1,3-butadiene, 1,3-pentadiene, 2-methyl-1,3-pentadiene, 3-methyl-1,3-pentadiene, 1,3-hexadiene, 4,5-diethyl-1,3-butadiene, phenyl-1,3-butadiene, 4,5-diethyl-1,3-octadiene, 3-butyl-1,3-octadiene, 1,3-cyclohexadiene, 1,3,7-octatriene, myrcene (7-methyl-3-methyleneocta-1,6-diene), and farnesene (3,7,11-trimethyl-1,3,6,10-dodecatetraene). These conjugated dienes may be used singly or in combination of two or more kinds thereof. Among these, butadiene or isoprene is preferably included, and butadiene, isoprene, or a mixture of butadiene and isoprene is more preferable.

Examples of the aromatic vinyl compound which can be used as the monomer include styrene, α-methylstyrene, α-methyl-4-methylstyrene, 2-methylstyrene, 3-methylstyrene, 4-methylstyrene, 2,4-dimethylstyrene, 2,5-dimethylstyrene, 3,4-dimethylstyrene, 3,5-dimethylstyrene, 2-ethylstyrene, 3-ethylstyrene, 4-ethylstyrene, 4-n-propylstyrene, 4-isopropylstyrene, 4-tert-butylstyrene, 4-cyclohexylstyrene, 4-dodecylstyrene, 2-ethyl-4-benzylstyrene, 4-(4-phenyl-n-butyl)styrene, 1-vinylnaphthalene, 2-vinylnaphthalene, 1,1-diphenylethylene, N,N-dimethyl-p-aminoethylstyrene, N,N-diethyl-p-aminoethylstyrene, 1,2-divinylbenzene, 1,3-divinylbenzene, 1,4-divinylbenzene, 1,2-divinyl 3,4-dimethylbenzene, 2,4-divinylbiphenyl, 1,3-divinylnaphthalene, 1,2,4-trivinylbenzene, 3,5,4'-trivinylbiphenyl, 1,3,5-trivinylnaphthalene, and 1,5,6-trivinyl-3,7-diethylnaphthalene. These aromatic vinyl compounds may be used singly or in combination of two or more kinds thereof, and among these, styrene is preferable.

The conjugated dienes and the aromatic vinyl compounds may be used singly or in combination of two or more kinds thereof, and may also be used after being diluted with a solvent which can be used in the polymerization.

In order to control the binding mode of the conjugated diene constituting the anionic polymer (for example, in a case of butadiene, a 1,2-bond unit and a 1,4-bond unit, and in a case of isoprene, a 1,2-bond unit, a 3,4-bond unit, and a 1,4-bond unit), a Lewis base can coexist at the time of the anionic polymerization.

Examples of such a Lewis base include acyclic monoethers such as dimethyl ether, methylethyl ether, diethyl ether, ethylpropyl ether, dipropyl ether, butylmethyl ether, tert-butylmethyl ether, dibutyl ether, dioctyl ether, ethylphenyl ether, and diphenyl ether; acyclic diethers such as 1,2-dimethoxyethane, 1,2-diethoxyethane, 1,2-diisopropoxyethane, 1,2-dibutoxyethane, 1,2-diphenoxyethane, 1,2-dimethoxypropane, 1,2-diethoxypropane, 1,2-diphenoxypropane, 1,3-dimethoxypropane, 1,3-diethoxypropane, 1,3-diisopropoxypropane, 1,3-dibutoxypropane, and 1,3-diphenoxypropane; cyclic ethers such as tetrahydrofuran, tetrahydropyran, and 1,4-dioxane; and acyclic polyethers such as diethylene glycol dimethyl ether, dipropylene glycol dimethyl ether, dibutylene glycol dimethyl ether, diethylene glycol diethyl ether, dipropylene glycol diethyl ether, dibutylene glycol diethyl ether, triethylene glycol dimethyl ether, tripropylene glycol dimethyl ether, tributylene glycol dimethyl ether, triethylene glycol diethyl ether, tripropylene glycol diethyl ether, tributylene glycol diethyl ether, tetraethylene glycol dimethyl ether, tetrapropylene glycol dimethyl ether, tetrabutylene glycol dimethyl ether, tetraethylene glycol diethyl ether, tetrapropylene glycol diethyl ether, and tetrabutylene glycol diethyl ether; and tertiary monoamines such as trimethylamine, triethylamine, tripropylamine, triisopropylamine, tributylamine, triisobutylamine, trisec-butylamine, tritert-butylamine, tripentylamine, triisopentylamine, trineopentylamine, trihexylamine, triheptylamine, trioctylamine, triphenylamine, tribenzylamine, N,N-dimethylethylamine, N,N-dimethylpropylamine, N,N-dimethylisopropylamine, N,N-dimethylbutylamine, N,N-dimethylisobutylamine, N,N-methyl-sec-butylamine, N,N-dimethyl-tert-butylamine, N,N-dimethylpentylamine, N,N-dimethylisopentylamine, N,N-dimethylneopentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-dimethylphenylamine, N,N-dimethylbenzylamine, N,N-diethylmonomethylamine, N,N-dipropylmonomethylamine, N,N-diisopropylmonomethylamine, N,N-dibutylmonomethylamine, N,N-diisobutylmonomethylamine, N,N-disec-butylmonomethylamine, N,N-ditert-butylmonomethylamine, N,N-dipentylmonomethylamine, N,N-diisopentylmonomethylamine, N,N-dineopentylmonomethylamine, N,N-dihexylmonomethylamine, N,N-diheptylmonomethylamine, N,N-dioctylmonomethylamine, N,N-dinonylmonomethylamine, N,N-didecylmonomethylamine, N,N-diundecylmonomethylamine, N,N-didodecylmonomethylamine, N,N-diphenylmonomethylamine, N,N-dibenzylmonomethylamine, N,N-dipropylmonomethylamine, N,N-diisopropylmonoethylamine, N,N-dibutylmonoethylamine, N,N-diisobutylmonoethylamine, N,N-disec-butylmonoethylamine, N,N-ditert-butylmonoethylamine, N,N-dipentylmonoethylamine, N,N-diisopentylmonoethylamine, N,N-dineopentylmonoethylamine, N,N-dihexylmonoethylamine, N,N-diheptylmonoethylamine, N,N-dioctylmonoethylamine, N,N-diundecylmonoethylamine, N,N-didodecylmonoethylamine, N,N-diphenylmonoethylamine, N,N-dibenzylmonoethylamine, N,N-dimethylaniline, N,N-ethylaniline, N-ethylpiperazine, N-methyl-N-ethylaniline, and N-methylmorpholine; and polyamines such as N,N,N'N'-tetramethylethylenediamine, N,N,N',N'-tetraethylethylenediamine, N,N,N,N",N"-pentamethyldiethylenetriamine, and tris[2-(dimethylamino)

ethyl]amine. Among these, tetrahydrofuran and N,N,N',N'-tetramethylethylenediamine are particularly preferable. These Lewis bases may be used singly or in combination of two or more kinds thereof. The amount of the Lewis base to be used is not particularly limited, and can be appropriately set, as desired. The Lewis base may be used after being diluted with a solvent which can be used in polymerization.

(Initiator)

At the time of anionically polymerizing the monomers, an organic alkali metal compound is usually used as an initiator. Examples of the organic alkali metal compound which can be used include organic lithium compounds such as methyl lithium, ethyl lithium, propyl lithium, isopropyl lithium, butyl lithium, sec-butyl lithium, tert-butyl lithium, isobutyl lithium, pentyl lithium, hexyl lithium, butadienyl lithium, cyclohexyl lithium, phenyl lithium, benzyl lithium, p-toluyl lithium, styryl lithium, trimethylsilyl lithium, 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene; and organic sodium compounds such as methyl sodium, ethyl sodium, n-propyl sodium, isopropyl sodium, n-butyl sodium, sec-butyl sodium, tert-butyl sodium, isobutyl sodium, phenyl sodium, sodium naphthalene, and cyclopentadienyl sodium. Among these, n-butyl lithium and sec-butyl lithium are preferable. The organic alkali metal compounds may be used singly or in combination of two or more kinds thereof.

Moreover, as an initiator for producing an anionic polymer, a living polymer formed by the polymerization of one or more kinds of conjugated diene using the organic alkali metal compound, a living polymer formed by the polymerization of one or more kinds of aromatic vinyl compound using the organic alkali metal compound, or a living copolymer formed by the polymerization of one or more kinds of conjugated diene and one or more kinds of aromatic vinyl compound using the organic alkali metal compound (these living polymers are hereinafter referred to as "living polymers I") can be used. That is, the anionic polymer may be bonded to the polymerization terminal of these living polymers I to form a copolymer. The binding mode in the copolymer is not particularly limited, and any of a random copolymer, a block copolymer, a block copolymer having a tapered structure, and a star copolymer is available, with the block copolymer being preferable.

Among those, as the living polymer I, in a case where an alkali metal cation derived from the organic alkali metal compound is denoted as M, a conjugated diene block composed of one or more kinds of conjugated diene is denoted as B, and an aromatic compound block composed of one or more kinds of aromatic vinyl compound is denoted as S, a living polymer having a block structure with any one of S-M, S-B-M, S-B-S-M, S-B-S-B-M, B-M, B-S-M, B-S-B-M, and B-S-B-S-M is preferable. The weight-average molecular weight (Mw) in terms of polystyrene, as measured by gel permeation chromatography of the living polymer I, is preferably less than 1,000,000, and more preferably 10,000 to 500,000. The molecular weight distribution (Mw/Mn) of the living polymer I is preferably 1.00 to 1.50.

Moreover, with respect to the initiator for producing an anionic polymer, a mixture of the organic alkali metal compound and the living polymer I may also be used as an initiator for producing an anionic polymer, as desired.

(Solvent)

The solvent which can be used in the production method of the present invention is not limited in the type and the amount to be used as long as it includes a solvent whose boiling point at atmospheric pressure (1 atm) is higher than the polymerization temperature, and examples thereof include saturated aliphatic hydrocarbons such as pentane (36.1° C.), isopentane (27.9° C.), 2,2,4-trimethylpentane (99° C.), hexane (68.7° C.), heptane (98.4° C.), isoheptane (90° C.), octane (125.7° C.), isooctane (99° C.), nonane (150.8° C.), decane (174.1° C.), cyclopentane (49.3° C.), cyclohexane (80.7° C.), methylcyclohexane (101.1° C.), ethylcyclohexane (132° C.), cycloheptane (118.1° C.), and methylcycloheptane (135.8° C.); and aromatic hydrocarbons such as benzene (80.1° C.), toluene (110.6° C.), ethylbenzene (136.2° C.), propylbenzene (159.2° C.), butylbenzene (183.4° C.), o-xylene (144.4° C.), m-xylene (139.1° C.), and p-xylene (138.4° C.). Among these, cyclohexane and n-hexane are particularly preferable. The solvents may be used singly or in combination of two or more kinds thereof. Among these, the solvent including 50% by mass or more of a hydrocarbon whose boiling point at atmospheric pressure is higher than the polymerization temperature as a component constituting the solvent is preferable, a solvent including 50% by mass or more of cyclohexane is more preferable, and a solvent including 80% by mass or more of cyclohexane is still more preferable. By using such a solvent, it is possible to remove the solvent from a reaction liquid including the obtained anionic polymer in an economically advantageous manner.

In addition, the solvent may include, within a range not impairing the effects of the present invention, a solvent whose boiling point at atmospheric pressure is lower than the polymerization temperature, for example, butane (−0.5° C.) or isobutane (−11.7° C.), or a solvent whose boiling point at atmospheric pressure is lower than the polymerization temperature, among the solvents exemplified above. The content of the solvent whose boiling point at atmospheric pressure is lower than the polymerization temperature is preferably less than 50% by mass, more preferably less than 30% by mass, and still more preferably less than 10% by mass.

(Polymerization Terminator)

Examples of the polymerization terminator which can be used in the production method of the present invention include a hydrogen molecule, an oxygen molecule, and water; alcohols such as methanol, ethanol, propanol, isopropanol, butanol, heptanol, cyclohexanol, phenol, benzyl alcohol, o-cresol, m-cresol, p-cresol, ethylene glycol, propylene glycol, butane diol, glycerin, and catechol; halogen compounds such as methyl chloride, methyl bromide, methyl iodide, ethyl chloride, ethyl bromide, ethyl iodide, butyl chloride, butyl bromide, butyl iodide, benzyl chloride, benzyl bromide, benzyl iodide, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl tributylsilyl fluoride, tributylsilyl chloride, tributylsilyl bromide, tributylsilyl iodide, triphenylsilyl fluoride, triphenylsilyl chloride, triphenylsilyl bromide, and iodide triphenylsilyl; ketones such as 2-heptanone, 4-methyl-2-pentanone, cyclopentanone, 2-hexanone, 2-pentanone, cyclohexanone, 3-pentanone, acetophenone, 2-butanone, and acetone; esters such as methyl acetate, ethyl acetate, and butyl acetate; and epoxy compounds such as ethylene oxide and propylene oxide. These polymerization terminators may be used singly or in combination of two or more kinds thereof. Further, these polymerization terminators may have a function as a terminal modifier for an anionic polymer. The amount of the polymerization terminator to be used is not particularly limited, and can be appropriately set, as desired, and the polymerization terminator may also be used after being diluted with a solvent which can be used in polymerization.

(Reaction Vessel)

The production method of the present invention may include anionically polymerizing the conjugated diene, the aromatic vinyl compound, or a mixture thereof as described above under a condition where the amount of an inert gas present with respect to 1 kg of a solvent whose boiling point at atmospheric pressure is higher than the polymerization temperature is 20 mmol or less. As the reaction vessel, a complete mixing-type reaction vessel having a reflux condenser directly or indirectly in the gas phase portion is preferably used. Further, in view of reducing the elution of the solvent components accompanied by the inert gas from the system, a pump for exhausting the inert gas so that the inert gas may be exhausted through the reflux condenser is preferably installed. The reaction vessel may have a jacket in the outside for the purpose of temperature control such as heating and cooling of the reaction liquid, the structure thereof is not particularly limited, and known modes of reaction vessels can be used. In addition, a cooling baffle, a cooling coil, or the like may further be provided in the inside of the reaction vessel for the purpose of increasing cooling heat transfer, as desired.

The stirring blade of the reaction vessel is not particularly limited, and examples thereof include a Maxblend blade, a full-zone blade, a paddle blade, a propeller blade, a turbine blade, a fan turbine blade, a Faudler blade, and a bull margin blade, and a combination of any two or more out of them is also available. Particularly, in a case where the viscosity of the obtained polymer solution is high, a Maxblend blade or a full-zone blade is preferably used since heat removal by a jacket can be promoted and the molecular weight distribution of the obtained anionic polymer can be controlled. The stirring method may be either upper stirring or lower stirring, but an upper stirring blade is preferable from the viewpoint that a washing operation, and repair and maintenance of a device can be simply performed.

The structure of the reflux condenser is not particularly limited, but a shell-and-tube reflux condenser is preferably used. For the reflux condenser, a plurality of reflux condensers may be connected to each other in series or in parallel, and different refrigerants may pass through the respective reflux condensers. Particularly, it is economically advantageous to use one reflux condenser in view of reducing the cost for the manufacture of a reaction vessel. When in a case of using one reflux condenser, the heat transfer area is denoted as A (m$^2$), and in a case of connecting a plurality of reflux condensers to each other, the total sum of the heat transfer areas is denoted as A (m$^2$), the A/V ratio of the heat transfer area A (m$^2$) to the inner volume V (m$^3$) of the reaction vessel is preferably 20 to 0.1, and more preferably 10 to 0.5. The type of the refrigerant that passes through the reflux condenser is not particularly limited, but an aqueous solution containing an antifreezing agent such as water, glycols, alcohols, glycerols, and glycerins can be preferably used. The temperature of the refrigerant is not particularly limited as long as it is in the range from a temperature at which the refluxing solvent is not frozen to the temperature of the reaction liquid, but is preferably in a range of −20° C. to 50° C., and more preferably in a range of 5° C. to 30° C., and such a temperature range is advantageous economically since a large freezer is not required. The flow amount of the refrigerant is not particularly limited as long as it is the range of less than the withstand pressure of the reflux condenser.

In a case of using the living polymer I as the anionic polymerization initiator, the method for producing the living polymer I is not particularly limited, and any of a batch type, a semi-batch type, and a continuous system is available. Further, the type of the reaction vessel is not particularly limited, and a complete mixing-type reaction vessel, a tubular reaction vessel, or one formed by connecting two or more of these vessels in series or in parallel can be used. However, it is preferable to use the same reaction vessel as in performing the anionic polymerization from the viewpoint that complex operations such as transport of a liquid are not required.

The production of the living polymer I is generally performed in an inert gas atmosphere. Specific examples of the operation include an operation in which a solvent and an organic alkali metal compound as a polymerization initiator are introduced into a reaction vessel purged with an inert gas, and heated to a predetermined temperature, and monomers are appropriately added thereto to produce the living polymer I. In addition, in a case of producing a living polymer including a conjugated diene as a monomer unit, as a living polymer I, a Lewis bases for controlling the binding mode of the conjugated diene may be added simultaneously at the time of adding the monomers, or may be introduced into the reaction vessel in advance.

The amount of the organic alkali metal compound to be used can be appropriately set in accordance with the weight-average molecular weight of a desired anionic polymer and the polymer concentration, but is preferably in a range of $2 \times 10^{-3}$ mmol to 500 mmol with respect to 1 kg of the reaction solvent. The polymerization temperature is not particularly limited, and is a temperature in the range from the freezing point of a solvent to the thermal decomposition temperature of a polymer, which can be selected from a range of −20° C. to 250° C., and is preferably in a range of 20° C. to 110° C. Within this temperature range, a living polymer having a narrow molecular weight distribution can be produced in a short reaction time. The pressure is not particularly limited, and the reaction time is not particularly limited, but can be usually selected from a range of 1 to 20 hours, and is preferably in a range of 2 to 10 hours. Within this time range, the living polymer I can be produced in an economically advantageous manner since a high monomer conversion rate of 90% or more can be accomplished.

The concentration of the living polymer I included in the reaction liquid including the living polymer I is not particularly limited, but the living polymer I is preferably produced such that the concentration may be in a range of 1% to 50% by mass, and within this range, a living polymer I having a narrow molecular weight distribution can be produced due to the low viscosity of the reaction liquid, and an anionic polymer which has a narrow molecular weight distribution and exhibits good mechanical properties can be produced. In addition, the concentration of the living polymer I may also be reduced by adding a solvent in a case of using the living polymer I in the production of the anionic polymer.

(Anionic Polymerization Method)

The method for producing an anionic polymer of the present invention will be described in detail. A solvent, and an organic alkali metal compound or the living polymer I as an anionic polymerization initiator are first introduced into a complete mixing-type reaction container provided with a reflux condenser and a pump for the exhaust of the inert gas. Further, an inert gas may be present in this step.

For performing anionic polymerization by feeding the monomers for an anionic polymer, exhausting is performed until the amount the inert gas present with respect to 1 kg of the reaction solvent becomes 20 mmol or less. The amount of the inert gas present with respect to 1 kg of the reaction solvent is preferably 15 mmol or less, more preferably 9 mmol or less, and still more preferably 5 mmol or less. By setting the amount of the inert gas in the reaction system to the range, the inside of the system is adjusted to a negative pressure, and the solvent can be refluxed with the reflux condenser to efficiently remove the heat of the polymerization reaction. The exhausting operation for reducing the amount of the inert gas present in the system may be carried out before, during, or after feeding the monomers for the anionic polymer.

From the viewpoint of reducing the amount of monomers accompanied by the inert gas to be exhausted, it is preferable that the inert gas is discharged out of the system by a pump through a reflux condenser before feeding the monomers for the anionic polymer, and the vapor of the solvent is filled into the gas phase portion, thereby causing the inert gas to be not substantially present, and then the monomers are fed to perform anionic polymerization in a sealed system.

Incidentally, there are cases where an inert gas together with a monomer is fed into the reaction system at the time of the feeding of the monomers; however, the amount of the inert gas is small and the heat removal efficiency in the reflux condenser is not significantly reduced. Thus, although it is not necessary to exhaust the inert gas at the time of the feeding of the monomers, it is preferable to carry out the exhausting operation at the time of completing the feeding of the monomers, if desired.

The concentration of the anions derived from the organic alkali metal compound or the active terminal anions derived from the living polymer I can be appropriately set in accordance with the weight-average molecular weight of a desired anionic polymer and the polymer concentration, but is preferably in a range of $2 \times 10^{-3}$ mmol to 500 mmol with respect to 1 kg of the reaction solvent. The reaction temperature for the anionic polymerization is not particularly limited as long as it is not more than the boiling point at atmospheric pressure of the solvent, and can be selected from a range of 20° C. to 110° C., and preferably in the range of 20° C. to 80° C. Within this temperature range, an anionic polymer which has a narrow molecular weight distribution and exhibits good mechanical properties can be produced in a short reaction time. The reaction time is not particularly limited, but can be usually selected from a range of 1 to 20 hours, and is preferably in a range of 2 to 10 hours. Within this time range, it is possible to produce an anionic polymer in an economically advantageous manner since a high monomer conversion rate of 90% or more can be accomplished.

The concentration of the obtained anionic polymer in the reaction liquid is not particularly limited, but the anionic polymer is preferably produced such that the concentration may be in a range of 1% to 50% by mass, and more preferably produced such that the concentration may be in a range of 5% to 25% by mass. In a case of using the living polymer I as a polymerization initiator, it is preferable to appropriately adjust the concentration and the use amount of the living polymer I such that the concentration of the obtained anionic polymer (a copolymer with the living polymer I) may be within the range. If the concentration of the anionic polymer is within the range, an anionic polymer which has a narrow molecular weight distribution and exhibits good mechanical properties can be produced due to a low viscosity of the reaction liquid.

The anionic polymer solution that can thus be acquired may be allowed to undergo an action with the polymerization terminator to terminate the polymerization operation, or new monomers may be added to the anionic polymer solution to perform a polymerization reaction and then terminate the polymerization.

In the production method of the present invention, it is necessary to perform anionic polymerization under the condition where the amount of the inert gas present with respect to 1 kg of the solvent used in the reaction is 20 mmol or less at the time of producing the anionic polymer, but in the final phase of the anionic polymerization reaction, specifically, at the time when the monomer conversion rate is 80% or more, and preferably 90% or more, a pressurizing operation using an inert gas may be performed. Since at the final phase of the anionic polymerization reaction, the polymerization rate decreases as the monomer concentration in the system decreases, and the quantity of heat generated per unit time decreases, and as a result, even while not removing the heat of the polymerization reaction with the reflux condenser, the heat of the polymerization reaction can be removed using a simple jacket or the like, and accordingly, temperature control can be achieved. Therefore, the polymerization termination reaction can also be performed after performing the pressurizing operation by the inert gas.

(Hydrogenation Method)

In a case where the anionic polymer that can thus be produced has an unsaturated double bond derived from a conjugated diene, the reaction liquid including the anionic polymer may be subjected to hydrogenation reaction as such or after being diluted with a solvent used for the polymerization, from the viewpoint of improving the heat resistance, oxidation resistance, weather resistance, ozone resistance, or the like of the anionic polymer. For the hydrogenation, various hydrogenation catalysts such as a nickel-based or cobalt-based Ziegler catalyst, and a titanium-based catalyst can be used without particular limitation. Since the amount of the titanium-based catalyst to be used is small due to a high catalytic activity per unit metal, as compared with the Ziegler catalyst, it is not necessary to remove the catalyst components from the hydrogenation reaction liquid or it is simple to remove the catalyst components.

Examples of the titanium-based catalyst include those obtained by reacting a bis(cyclopentadienyl)titanium dichloride with 2 equivalents or more of an organic alkali metal compound, followed by reacting the resultant with a conjugated diene, an alkali metal alkoxide, an organic aluminum compound, an organic magnesium compound, an organic zinc compound, an organic tin compound, an organic silane compound, or a compound capable of being a precursor of the above compound, as desired; those obtained by reacting bis(cyclopentadienyl)titanium dichloride with an alkali metal halide or 2 equivalents or more of an organic aluminum compound; and those obtained by reacting bis(cyclopentadienyl)titanium difluoride with an organic silane compound. If desired, as a co-catalyst for a titanium-based catalyst, an alkali metal halide, an alkali metal alkoxide, an organic aluminum compound, an organic magnesium compound, an organic zinc compound, an organic tin compound, an organic silane compound, or the like may further be used in combination.

The amount of the titanium-based catalyst to be used is preferably in a range of $1.0 \times 10^{-5}$ to $1.0 \times 10^{-1}$ millimoles in terms of titanium atoms with respect to 1 mole of the unsaturated double bond derived from the conjugated diene.

When the amount is $1.0 \times 10^{-5}$ millimoles or more, it is possible to initiate a hydrogenation reaction, and when the amount is $1.0 \times 10^{-2}$ millimoles or less, it is possible to prevent a yellowing change of a hydrogenated anionic polymer formed by isolation even without performing an operation for removing the catalyst components. The amount is more preferably in a range of $1.0 \times 10^{-3}$ to $1.0 \times 10^{-2}$ millimoles, and within this range, it is possible to accomplish a hydrogenation reaction time rate sufficient for industrial implementation and a hydrogenation rate sufficient as a product.

The hydrogenation temperature can be selected from a range of −20° C. to 250° C. which falls from the freezing point of the solvent to the thermal decomposition temperature of the anionic polymer, and it is preferably in a range of 30° C. to 150° C. since a hydrogenated conjugated diene polymer is produced in an industrially advantageous manner. If the hydrogenation temperature is 30° C. or higher, the hydrogenation reaction proceeds, and if the hydrogenation temperature is 150° C. or lower, hydrogenation can be carried out with a small amount of the catalyst to be used even when catalytic pyrolysis is accompanied. Particularly, in view of reducing the amount of the catalyst to be used, the hydrogenation temperature is more preferably in a range of 60° C. to 90° C.

Hydrogen molecules can be used in a gaseous form, and the pressure is not particularly limited as long as it is atmospheric pressure or higher, but is preferably in a range of 0 to 20 MPaG since a hydrogenated polymer can be produced in an industrially advantageous manner, and is more preferably in a range of 0.5 to 10 MPaG since the amount of the catalyst to be used can be reduced. If the pressure is 20 MPaG or less, hydrogenation can be carried out with a small amount of the catalyst to be used even when the catalytic hydrolysis concurs.

The time required for the hydrogenation may be appropriately selected depending on the conditions, but is preferably in a range of 10 minutes to 24 hours from the initiation of the coexistence with the catalyst since a hydrogenated anionic polymer can be produced in an industrially advantageous manner, with a range of 30 minutes to 10 hours being more preferable. If the time is 10 minutes or more, the hydrogenation rate can be controlled, and if the time is 24 hours or less, the thermal decomposition of the conjugated diene polymer can be inhibited.

The reaction liquid after the completion of the hydrogenation reaction, the catalyst components can be removed from the reaction liquid by further diluting with a solvent or concentrating, if necessary, and then washing with an aqueous basic solution or an aqueous acidic solution.

An anionic polymer solution or an anionic polymer solution after the hydrogenation may be subjected to a concentrating operation, and fed into an extruder, thereby isolating the polymer; the anionic polymer solution may be brought into contact with steam to remove a solvent or the like, thereby isolating the polymer; or the anionic polymer solution may be brought into contact with an inert gas in the heated state to remove a solvent or the like, thereby isolating the polymer.

EXAMPLES

Hereinafter, the present invention will be described in more detail with reference to Examples, but the present invention is not limited by such Examples and the like. "MPaG" in the notation for pressure means gauge pressure. Further, the chemicals used are as follows.

Cyclohexane: This was used after being dehydrated with Molecular Sieve 3A, and bubbled with nitrogen gas.

sec-Butyl lithium: 1.32 mmol/g cyclohexane solution thereof was used.

N,N,N',N'-tetramethylethylenediamine: This was used after being dehydrated with neutral activated alumina, and subjected to nitrogen gas bubbling, and if necessary, diluted with cyclohexane.

Butadiene: This was used after removing moisture and a polymerization inhibitor by Molecular Sieve 3A and neutral activated alumina, and then purging with nitrogen.

Styrene: This was used after removing moisture and a polymerization inhibitor by neutral activated alumina, and then purging with nitrogen.

(Measurement Conditions)

The weight-average molecular weight (Mw) and the molecular weight distribution (Mw/Mn) of the polymers obtained in the following Examples and Comparative Examples were measured in terms of standard polystyrene through the measurement by gel permeation chromatography (hereinafter referred to as GPC). The measurement conditions are as follows.

[GPC Analysis]

System: HLC-8320GPC EcoSEC Systems, manufactured by Tosoh Corporation,

Sample: Solution obtained by dissolving 5 mg of a polymer in 10 mL of tetrahydrofuran Sample injection volume: 1 Column: TSKgel SuperHZ4000, manufactured by Tosoh Corporation (inner diameter 4.6 mm×length 150 mm)

Column temperature: 40° C.

Eluent: Tetrahydrofuran

Eluent flow rate: 1.0 mL/min

Detector: UV Detector (detection wavelength 254 nm)

Calibration curve: Prepared using standard polystyrene

With respect to the polymers or polymerization intermediates obtained in the following Examples and Comparative Examples, $^1$H-nuclear magnetic resonance spectroscopy (hereinafter abbreviated as $^1$H-NMR analysis) was performed. The measurement conditions are as follows.

[$^1$H-NMR Analysis]

Apparatus: AVANCEIII 600USPlus, manufactured by Bruker BioSpin Corporation

Sample: Solution obtained by dissolving 50 mg of a polymer in 1.0 g of deuterated chloroform Reference material: Tetramethylsilane Measurement temperature: 32° C. (305 K)

Cumulative number of times: 256 times

Example 1

(1) The inside of an SUS316-made autoclave having a capacity of 3 L, which was equipped with a 100 mL glass-made pressure-resistant bottle provided with a thermometer, an electric heater, an electromagnetic induction stirring device, a gas inlet, a sampling port, a raw material inlet, and a water-cooled condensing tube, was purged with nitrogen gas. Then, 1513.0 g of cyclohexane and 1.235 g of a 1.32 mmol/g cyclohexane solution of sec-butyl lithium (1.63 mmol in terms of sec-butyl lithium) were added thereto, and the mixture was heated to 50° C. over 30 minutes with stirring at 500 rpm. Then, 45.54 g (437.3 mmol) of styrene was added all at once into the autoclave, and the pressure was raised to 0.3 MPaG with nitrogen gas to perform polymerization at a liquid temperature of 50° C. to 52° C. for 1 hour.

The reaction liquid after 1 hour of the reaction was sampled, and 2 g of the sample solution was added to 20 g of ethanol in a nitrogen atmosphere to precipitate and collect the polymer, and then the polymer was dried at 60° C. for 1 hour to thereby obtain polystyrene in the solid state. According to GPC analysis, the weight-average molecular weight (Mw) and the molecular weight distribution (Mw/Mn) of the polystyrene were 27,500 and 1.03, respectively.

(2) Subsequently, 2.348 g of a 0.500 mmol/g cyclohexane solution of N,N,N',N'-tetramethylethylenediamine (1.174 mmol in terms of N,N,N',N'-tetramethylethylenediamine) was added to the styrene polymerization liquid being the reaction liquid of (1) in the autoclave, then the nitrogen gas was discharged for 10 minutes with the vacuum pump connected to the 100 mL glass-made pressure-resistant bottle, and the system was sealed with a pressure of the inside of the autoclave set to −0.063 MPaG.

The thermometer connected to the 100 mL glass-made pressure-resistant bottle exhibited 22° C. at 0.3 MPaG immediately before the exhausting, but the temperature increased as the exhausting proceeded, thus exhibiting −0.063 MPaG and 48° C. after the completion of the exhausting. Thus, it was confirmed that the inside of the reaction vessel was filled with cyclohexane vapor.

176.08 g (3255.3 mmol) of butadiene at 23° C.±2° C. contained in a pressure-resistant container in which the total pressure had been enhanced to 0.3 MPaG with nitrogen gas was fed over 10 minutes. The liquid temperature in the sealed system was controlled to 50° C. to 52° C. and the polymerization was performed for 2 hours after the initiation of the feeding of butadiene. Thereafter, the pressure of the inside of the autoclave was raised to 0.4 MPaG by introducing nitrogen gas, and polymerization was further performed for 1 hour at a liquid temperature of 53° C.±3° C.

The amount of nitrogen dissolved with respect to liquefied butadiene is clarified in INDUSTRIAL AND ENGINEERING CHEMISTRY, Vol. 40, No. 9, 1948, pp. 1703 to 1707, and 6.53 mmol of nitrogen molecules are included in 176.08 g of butadiene fed above. Thus, under the polymerization condition mentioned above, 4.30 mmol of nitrogen molecules with respect to 1 kg of cyclohexane as a solvent were present.

In order to quantify the polymerized butadiene, 5 g of the sample solution at a desired reaction time with respect to 1 g of methanol was obtained in a nitrogen atmosphere, and 5 g of acetone was added thereto. Methanol was appropriately further added to the mixture to precipitate and collect the polymer, and the polymer was dried at 60° C. for 1 hour to thereby obtain a polymerization intermediate in the solid state.

According to the $^1$H-NMR analysis of the polymerization intermediate, a peak which could be assigned to a hydrogen atom 5H bonded to an aromatic ring of styrene could be observed in δ 6.2 to 7.5 ppm, a peak which could be assigned to a 1,2-bond unit 2H of butadiene could be observed in δ 4.8 to 5.1 ppm, and a peak which could be assigned to a 1,4-bond unit 2H of butadiene could be observed in δ 5.2 to 5.5 ppm.

All styrenes form a styrene block, and the molar amount of butadiene bonded to the styrene block was calculated from the ratio of the integral value of styrene peaks to the integral value of the peaks derived from butadiene having various binding modes (a 1,2-bond unit and a 1,4-bond unit).

Subsequently, the ratio of the total molar amount of butadiene bonded to the styrene block to the total molar amount of butadiene introduced was defined as a conversion rate (%), and the conversion rate of butadiene was calculated.

When the point of time at which the feeding of the butadiene is initiated is taken as Reaction 0 hour, the pressure and the conversion rate after 30 minutes of the reaction were 0.00 MPaG and 68.5%, respectively. The pressure and the conversion rate after 1 hour of the reaction were −0.018 MPaG and 87.5%, respectively. The pressure and the conversion rate after 2 hours of the reaction were −0.030 MPaG and 99.1%, respectively. The polymerization pressure was set to 0.30 MPaG with nitrogen gas immediately after the sampling in 2 hours of the reaction. The pressure and the conversion rate after 3 hours of the reaction were 0.30 MPaG and 99.8%, respectively. The results are shown in Table 1.

(3) Then, 45.54 g (437.3 mmol) of styrene was further added all at once to the polymerization liquid after the butadiene reaction in (2), and the pressure was raised to 0.5 MPaG with nitrogen gas, and under the pressure, a reaction was performed at a liquid temperature of 50° C. to 52° C. for 1.5 hours. Thereafter, 3.30 g of a 0.50 mmol/g cyclohexane solution of ethanol (1.650 mmol in terms of ethanol) was added thereto to terminate the polymerization, thereby obtaining a styrene-butadiene-styrene block copolymer.

According to the GPC analysis, Mw and Mw/Mn of the obtained block copolymer were 267,100 and 1.04, respectively. Further, from the $^1$H-NMR analysis, the ratio (a degree (%) of vinylation) of the total molar amount of butadiene which performs the polymerization in a 1,2-binding mode and is formed by the binding to a styrene block was 47.1%. The analysis results are shown in Table 2.

Comparative Reference Example 1

In (2) of Example 1, the process was kept at 0.3 MPaG for 10 minutes, instead of the operation of reducing the pressure of the inside of the autoclave to −0.063 MPaG over 10 minutes with a vacuum pump. Further, 176.08 g of butadiene stored in a pressure-resistant container in which the entire pressure had been enhanced to 0.5 MPaG with nitrogen gas was fed over 10 minutes. Except for these, the same operation as in Example 1 was carried out. The changes in the conversion rate of butadiene over time are shown in Table 1, and the analysis results of the obtained block copolymer are shown in Table 2.

According to The Chemical Engineering Journal, Vol. 15, 1978, pp. 209 to 214, 43.12 mmol of nitrogen is dissolved in 1513.0 g of cyclohexane in a reaction system under a condition where the internal pressure is 0.3 MPaG and the liquid temperature is 50° C. to 52° C. Further, 6.53 mmol of nitrogen molecules are included in 176.08 g of butadiene fed above. Accordingly, under the polymerization condition mentioned above, at least 32.81 mmol of nitrogen molecules were present, with respect to 1 kg of cyclohexane as a solvent.

TABLE 1

|  | Example 1 | Comparative Reference Example 1 |
|---|---|---|
| Pressure (MPaG) before the feeding of butadiene | −0.067 | 0.3 |
| Conversion rate (%)/pressure (MPaG) after 0.5 hr from initiation of reaction | 68.5/0.00 | 68.7/0.40 |

TABLE 1-continued

|  | Example 1 | Comparative Reference Example 1 |
|---|---|---|
| Conversion rate (%)/pressure (MPaG) after 1 hr from initiation of reaction | 87.5/−0.018 | 88.3/0.40 |
| Conversion rate (%)/pressure (MPaG) after 2 hr from initiation of reaction | 99.1/−0.030 | 99.5/0.40 |
| Conversion rate (%)/pressure (MPaG) after 3 hr from initiation of reaction | 99.8/0.30 | 99.8/0.40 |

TABLE 2

| Mw of block copolymer | 267,100 | 260,200 |
|---|---|---|
| Mw/Mn of block copolymer | 1.04 | 1.04 |
| Degree (%) of vinylation of butadiene polymer block | 47.1 | 46.8 |

Example 1 and Comparative Reference Example 1 are directed to a system in which after the styrene polymerization, anionic polymerization is performed by using cyclohexane as a solvent whose boiling point at atmospheric pressure is higher than the polymerization temperature, and feeding butadiene having a boiling point lower than the polymerization temperature as a monomer. Accordingly, the system is under the condition where butadiene as the monomer is easily retained in the gas phase portion. However, between Example 1 involving performing polymerization with an amount of the inert gas present with respect to 1 kg of the solvent set to 20 mmol or less in the reaction system by removing the inert gas and Comparative Reference Example 1 involving performing polymerization by dissolving the monomers in a liquid phase under pressurization with the inert gas, there was no difference in the reaction rate, and a conversion rate of 99.1% was accomplished after 2 hours from the initiation of the reaction. In PTL 12, it is pointed out that in a case of using a low-boiling-point monomer, there is a possibility that the low-boiling-point monomer is retained in a gas phase portion in any time, but the present inventors have revealed that when anionic polymerization is performed under the conditions defined by the present invention, even in a case of using a low-boiling-point monomer, the polymerization reaction can be driven while the low-boiling-point monomer is not retained in the gas phase portion.

Example 2

Figure 1:
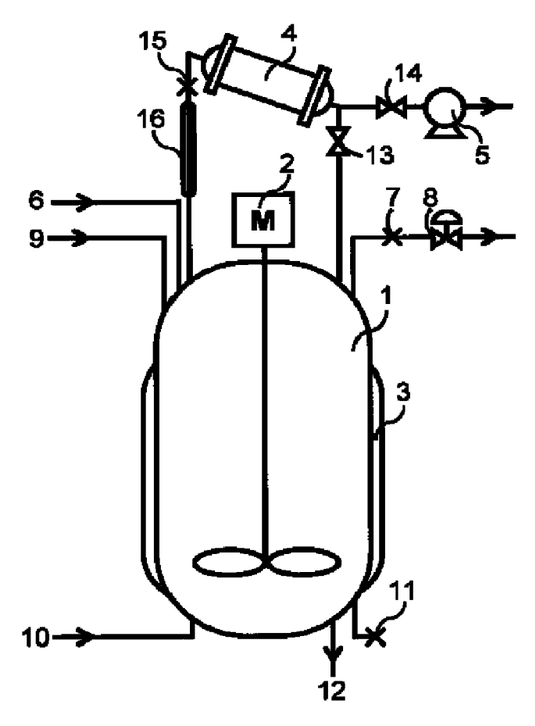
FIG. 1 is a schematic diagram illustrating a reaction vessel used in the present invention.

An anionic polymerization reaction was performed using the apparatus shown in FIG. 1. 1 is a reaction vessel having a volume of 2.7 m³; 2 is a stirrer, in which the power number in the production of a living polymer and an anionic polymer is 1.7 kW/m³; 3 is a simple jacket having a heat transfer area of 7.3 m², in which the temperature can be changed in a range from 10° C. to 100° C. according to the purpose while keeping the flow rate of the refrigerant constant at 3.0 m³/hr; 4 is a reflux condenser having a heat transfer area of 12 m², which makes a refrigerant having a temperature of 10° C. pass constantly at 7.0 m³/hr; 5 is an exhaust pump with an evacuation amount of 8 m³/hr; 6 is an inert gas inlet; 7 is a pressure gauge; 8 is a pressure adjusting valve; 9 is an inlet for a solvent, a polymerization initiator, a vinylating agent, and a polymerization terminator; 10 is a monomer inlet; 11 is a liquid phase thermometer; 12 is a sampling port; 13 is a reflux condensate shutoff valve, which is normally in the open state except for a case where an exhaust pump is not run; 14 is an exhaust gas shutoff valve, which is normally in the closed state except for a case where an exhaust pump is run; 15 is a thermometer for vapor; and 16 is a jacket for vapor, which is heated at 10 MJ/hr only in a case of performing anionic polymerization in the state where an inert gas is not substantially present. Incidentally, the A/V ratio of the heat transfer area A (m²) of the reflux condenser to the inner volume V (m³) of the reaction vessel was 4.4.

1133.3 kg of cyclohexane was introduced into a reaction vessel 1 which had been purged with nitrogen. It was heated until the liquid temperature reached 50° C. while keeping the nitrogen gas at 0.1 MPaG, 19.051 kg of a 57.95 mmol/kg cyclohexane solution of sec-butyl lithium (1.104 mol in terms of sec-butyl lithium) was added thereto, and immediately, 34.2 kg of styrene (328.4 mol in terms of styrene) was fed at a constant rate over 15 minutes, and polymerization was further performed for 30 minutes. Here, a portion of the reaction liquid was sampled, terminated, precipitated, and collected with ethanol to obtain polystyrene. Next, the internal pressure was reduced up to 0.03 MPaG over 10 minutes while keeping the liquid temperature at 50° C., and then 18.898 kg of a 26.88 mmol/kg cyclohexane solution of N,N,N',N'-tetramethylethylenediamine (0.508 mol in terms of N,N,N',N'-tetramethylethylenediamine) was added thereto. Then, the reflux condensate shutoff valve 13 was closed, and the exhaust gas shutoff valve 14 was opened to thereby run the exhaust pump, and nitrogen gas was exhausted over 20 minutes so that the internal pressure was set to −0.065 MPaG. Thereafter, immediately, the exhaust gas shutoff valve 14 was closed and the reflux condensate shutoff valve 13 was opened to seal the system.

Furthermore, the thermometer 15 for vapor exhibited 6° C. at 0.03 MPaG immediately before the exhausting, but the temperature was raised as the exhausting proceeded, and the thermometer 15 for vapor exhibited 47° C. at −0.065 MPaG after the completion of the exhausting. Thus, it was confirmed that the inside of the reaction vessel was filled with cyclohexane vapor.

In addition, according to the GPC analysis, the peak of polystyrene obtained from the sampled reaction liquid was single, Mw was 30,900, and Mw/Mn was 1.02.

Steam was flown through the jacket 16 for vapor to perform heating at 10 MJ/hr, and then polymerization was performed while 132.1 kg (2446.3 mol) of liquefied butadiene stored at 10° C. in a pressure-resistant container in which the entire pressure was enhanced to 0.3 MPaG with nitrogen was fed at a constant rate over 1 hour into the reaction vessel from which the inert gas had been substantially removed. Thereafter, polymerization was further performed for 1 hour in the sealed system, and after pressurization was performed with nitrogen so as to provide 0.4 MPaG, polymerization was further performed for 1 hour.

According to INDUSTRIAL AND ENGINEERING CHEMISTRY, Vol. 40, No. 9, 1948, pp. 1703 to 1707, 4.902 mol of nitrogen molecules are included in 132.1 kg of butadiene fed above. Thus, under the polymerization condition mentioned above, at most 4.18 mmol of nitrogen molecules with respect to 1 kg of cyclohexane as a solvent were present.

In the same manner as in Example 1, the conversion rate of butadiene in a case where the point of time at which the feeding of the butadiene is initiated is taken as Reaction 0 hour was determined, and the pressure at the point of time of sampling was also confirmed. Further, the total molar amount of butadiene used for calculation of the conversion rate of butadiene was set to 2446.3 mol which may be the amount during the feeding of butadiene or may be a total amount of the butadiene fed. When the point of time at which the feeding of the butadiene is initiated is taken as Reaction 0, the pressure after 30 minutes of the reaction was −0.0218 MPaG and the conversion rate was 16.8%. The pressure after 1 hour of the reaction was 0.0012 MPaG and the conversion rate was 51.7%. The pressure after 2 hours of the reaction was −0.0399 MPaG and the conversion rate was 98.4%. The polymerization pressure was set to 0.30 MPaG with nitrogen gas immediately after the sampling in 2 hours of the reaction, and the pressure after 3 hours of the reaction was 0.30 MPaG and the conversion rate was 99.8%. The results are shown in Table 3.

The heat of the polymerization reaction of butadiene was clarified in Part of the Journal of the National Bureau of Standards, Vol. 44, 1950, pp. 221 to 232, or the like, and the heat is 1.345 MJ/kg in a 1,2-binding mode and 1.446 MJ/kg in a 1,4-binding mode. On the other hand, the molar amounts in the butadiene polymerized over time are clarified by $^1$H-NMR analysis, and were used to calculate the quantity $Q_{REACT}$ (MJ) of heat of the polymerization reaction.

The heat capacities of butadiene and cyclohexane are clarified in Ludwig's Applied Process Design for Chemical and Petrochemical Plants, Vol. 2, $4^{th}$ Edition, Gulf Professional Publishing, 2010, pp. 766 to 767, and the like. The heat capacity of butadiene at 55° C. is 2.43 kJkg$^{-1}$K$^{-1}$, and the heat capacity of cyclohexane at 55° C. is 2.00 kJkg$^{-1}$K$^{-1}$. Incidentally, the heat capacity of the cyclohexane solution of the polymer was not significantly different from the heat capacity of cyclohexane itself, and was therefore regarded as 2.00 kJkg$^{-1}$K$^{-1}$. The change in the temperature of the polymer solution was confirmed by an interval of 1 minute, and the quantity $Q_{CM}$ (MJ) of heat storage was calculated from the change in temperature.

The flow rate of the refrigerant in the simple jacket 3 was 3.0 m$^3$/hr, the change in temperature between the inlet temperature and the outlet temperature was confirmed at an interval of 1 minute, and the quantity $Q_{JK}$ (MJ) of heat removal of the simple jacket was calculated from the integral value of the temperature difference.

Heating was performed at 10 MJ/hr with the jacket 16 for vapor, and the quantity $Q_{VAP}$ (MJ) of heat supply of the jacket for vapor was calculated.

The total quantity $Q_{CON}$ (MJ) of heat removal in the reflux condenser 4 was calculated by subtracting the quantity $Q_{CM}$ (MJ) of heat storage and the quantity $Q_{JK}$ (MJ) of heat removal of the simple jacket from the quantity $Q_{REACT}$ (MJ) of heat of the polymerization reaction and the quantity $Q_{VAP}$ (MJ) of heat supply of the jacket for vapor.

After 30 minutes of the reaction, $Q_{REACT}$ was 31 MJ, $Q_{VAP}$ was 5 MJ, $Q_{CM}$ was 8 MJ, $Q_{JK}$ was 9 MJ, and $Q_{CON}$ was 19 MJ; after 1 hour of the reaction, $Q_{REACT}$ was 104 MJ, $Q_{VAP}$ was 10 MJ, $Q_{CM}$ was 24 MJ, $Q_{JK}$ was 47 MJ, and $Q_{CON}$ was 44 MJ; after 2 hours of the reaction, $Q_{REACT}$ was 181 MJ, $Q_{VAP}$ was 20 MJ, $Q_{CM}$ was 25 MJ, $Q_{JK}$ was 115 MJ, and $Q_{CON}$ was 61 MJ; and when the polymerization pressure was set to 0.30 MPaG with nitrogen gas immediately after the sampling in 2 hours of the reaction, and the heating of the jacket for vapor was terminated, after 3.0 hours of the reaction, $Q_{REACT}$ was 183 MJ, $Q_{VAP}$ was 20 MJ, $Q_{CM}$ was 26 MJ, $Q_{JK}$ was 116 MJ, and $Q_{CON}$ was 61 MJ. The results are shown in Table 3.

Thereafter, 34.1 kg of styrene (327.4 mol in terms of styrene) was fed at a constant rate over 15 minutes at 0.45 MPaG, and polymerization was further performed for 1 hour. Thereafter, 1.0 kg of a 1.0 mol/kg cyclohexane solution of ethanol (1.0 mol in terms of ethanol) was added thereto, and a reaction is further performed for 10 minutes, then the inside of the autoclave was pressurized to 1.0 MPaG with hydrogen and a reaction was performed for 1.5 hours, and then, the polymerization is terminated, thereby obtaining a styrene-butadiene-styrene block copolymer.

According to the GPC analysis, the peak was single, and Mw and Mw/Mn of the obtained copolymer were 308,700 and 1.08, respectively. According to the $^1$H-NMR analysis, the degree of vinylation was 41.3%.

TABLE 3

| Time (hr) | Temperature (° C.) | Pressure (MPaG) | Conversion rate (%) | $Q_{REACT}$ (MJ) | $Q_{Vap}$ (MJ) | $Q_{CM}$ (MJ) | $Q_{JK}$ (MJ) | $Q_{CON}$ (MJ) |
|---|---|---|---|---|---|---|---|---|
| 0 | 50.8 | −0.0627 | 0.0 | 0 | 0 | 0 | 0 | 0 |
| 0.5 | 50.3 | −0.0218 | 16.8 | 31 | 5 | 8 | 9 | 19 |
| 1 | 53.7 | +0.0012 | 51.7 | 104 | 10 | 24 | 47 | 44 |
| 2 | 54.1 | −0.0399 | 98.4 | 181 | 20 | 25 | 115 | 61 |
| 3 | 54.3 | +0.2594 | 99.7 | 183 | 20 | 26 | 116 | 61 |

In Example 2, the inert gas in the reaction system was removed to the utmost before the initiation of the anionic polymerization so as to set the amount of the inert gas present with respect to 1 kg of the solvent to 20 mmol or less, thereby allowing the reflux condenser to remove 61 MJ of heat out of 201 MJ of the total quantity ($Q_{CM}$+$Q_{JK}$+$Q_{CON}$) of heat removal after 2 hours of the reaction. Since the removal quantity accounts for 30% of the total quantity of heat removal, it is evident that the heat of the polymerization reaction can be quickly removed according to the method of the present invention. Further, the conversion rate at the time of point after 2 hours of the reaction was 98.4%, and it was also proven that the reaction was almost completely driven. Incidentally, the pressurizing operation with nitrogen gas was performed after 2 hours to 3 hours of the reaction, during which the polymerization rate was reduced as the concentration of butadiene in the system was reduced. Thus, the quantity $Q_{REACT}$ of heat of the polymerization reaction per unit time is small, and therefore, temperature control could be sufficiently achieved by heat removal with a simple jacket.

INDUSTRIAL APPLICABILITY

With respect to the effects of the present invention, in the case where butadiene having a boiling point at atmospheric pressure of −4.4° C. was anionically polymerized at 50° C. to 55° C. in a cyclohexane solvent having a boiling point at atmospheric pressure of 80.7° C. under a condition where an inert gas was not substantially present, the butadiene polymerization rate and the conversion rate, which are comparable to those in a case where a large amount of inert gases is allowed to be present in the system for promoting the liquefaction of butadiene, can be achieved, and the heat of the polymerization reaction can be quickly removed with a simple reaction vessel, and therefore, the polymerization temperature can be controlled. That is, it is clear that monomers whose boiling point at atmospheric pressure is lower than the polymerization temperature can be anionically polymerized at a sufficient polymerization rate and a sufficient conversion rate, using a solvent whose boiling point at atmospheric pressure is higher than the polymerization temperature, and the heat of the polymerization reaction can be quickly removed with a simple reaction vessel. In a case of using monomers whose boiling point at atmospheric pressure is lower than the polymerization temperature, while the polymerization rate and the conversion rate are reduced due to retention of the monomers retained in a gas phase portion and it becomes difficult to remove the heat of the polymerization reaction, a sufficient monomer polymerization rate, a sufficient conversion rate, and removal of the heat of the polymerization reaction are accomplished. Thus, it is clear that the present invention can also be applied to the polymerization of the monomers whose boiling point at atmospheric pressure is lower than the polymerization temperature.

Therefore, according to the present invention, at the time of anionically polymerizing monomers using a solvent whose boiling point at atmospheric pressure is higher than the polymerization temperature, temperature control can be achieved by quickly removing the heat of the polymerization reaction using a simple device, and thus, an anionic polymer can be produced in an industrially advantageous manner.

REFERENCE SIGNS LIST

1; Reaction vessel, diameter 1.2 m, height 2.7 m, volume 2.7 $m^3$
2; Stirrer, ordinarily stirred at 1.7 kW/$m^3$
3; Simple jacket, heat transfer area 7.3 $m^2$, allowing a refrigerant to pass at a constant rate of 3.0 $m^3$/hr
4; Reflux condenser, heat transfer area 12 $m^2$, allowing a refrigerant at 10° C. to pass at a constant rate of 7.0 $m^3$/hr
5; Exhaust pump 8 $m^3$/hr
6; Inert gas inlet
7; Pressure gauge
8; Pressure adjusting valve
9; Inlet for a solvent, a polymerization initiator, and a polymerization terminator
10; Monomer inlet
11; Liquid phase thermometer
12; Sampling port
13; Reflux condensate shutoff valve
14; Exhaust gas shutoff valve
15; Thermometer for vapor
16; Jacket for vapor, capable of heating vapor at 10 MJ/hr

The invention claimed is:

1. A method for producing an anionic polymer, the method comprising:
decompressing a reaction system comprising a solvent and an inert gas, such that the inert gas is discharged from the reaction system; and then
anionically polymerizing a conjugated diene, or the conjugated diene and an aromatic vinyl compound, in the reaction system at a polymerization temperature and under an atmospheric pressure or below, such that an amount of the inert gas present with respect to 1 kg of the solvent is 20 mmol or less,
wherein a boiling point of the solvent at atmospheric pressure is higher than the polymerization temperature.

2. The method according to claim 1, further comprising:
increasing the pressure of the reaction system and anionically polymerizing the conjugated diene, or the conjugated diene and the aromatic vinyl compound, under a positive pressure.

3. The method according to claim 1, wherein an organic alkali metal compound, or a living copolymer formed by the polymerizing of at least one of the conjugated diene, at least one of the aromatic vinyl compound, or at least one of the conjugated diene and at least one of the aromatic vinyl compound using the organic alkali metal compound, is an initiator for the anionic polymerizing.

4. The method according to claim 1, wherein the anionic polymerizing is performed in a complete mixing-type reaction vessel having a reflux condenser having an A/V ratio of the heat transfer area A ($m^2$) of the reflux condenser to the inner volume V ($m^3$) of the reaction vessel of 20 to 0.1.

5. The method according to claim 1, wherein the anionic polymerizing is performed at a reaction temperature ranging from 20° C. to 110° C.

6. The method according to claim 1, wherein the solvent comprises 50% by mass or more of cyclohexane.

7. The method according to claim 1, wherein the anionic polymer is a block copolymer.

8. The method according to claim 1, comprising performing an operation of exhausting the inert gas in a reaction system of the anionic polymerizing before, during or after providing a monomer for the anionic polymerizing into the reaction system, such that the reaction system is filled with solvent vapor.

9. The method according to claim 1, further comprising:
performing a pressurizing operation using the inert gas, after the condition where the amount of the inert gas present with respect to 1 kg of the solvent is 20 mmol or less is maintained, until a monomer conversion rate in the anionic polymerizing is 80% or more.

10. The method according to claim 1, comprising:
polymerizing the aromatic vinyl compound to obtain a polymer of the aromatic vinyl compound; and then
anionically polymerizing the conjugated diene and the polymer of the aromatic vinyl compound.

11. The method according to claim 1, wherein the conjugated diene and the aromatic vinyl compound are polymerized in the anionic polymerizing.

12. The method according to claim 1, wherein the anionic polymerizing includes polymerizing under a reduced pressure.

* * * * *